(12) United States Patent
Kuo

(10) Patent No.: US 9,897,216 B1
(45) Date of Patent: Feb. 20, 2018

(54) STOP VALVE

(71) Applicant: Kuang-Ming Kuo, New Taipei (TW)

(72) Inventor: Kuang-Ming Kuo, New Taipei (TW)

( * ) Notice: Subject to any disclaimer, the term of this patent is extended or adjusted under 35 U.S.C. 154(b) by 0 days.

(21) Appl. No.: 15/285,758

(22) Filed: Oct. 5, 2016

(51) Int. Cl.
*F16K 5/06* (2006.01)
*F16K 27/06* (2006.01)
*F16K 31/60* (2006.01)

(52) U.S. Cl.
CPC .......... *F16K 5/0626* (2013.01); *F16K 5/0689* (2013.01); *F16K 27/067* (2013.01); *F16K 31/602* (2013.01)

(58) Field of Classification Search
CPC ........ F16K 5/06; F16K 5/0626; F16K 5/0689; F16K 27/067
USPC .................................. 251/315.1–315.13, 310
See application file for complete search history.

(56) References Cited

U.S. PATENT DOCUMENTS

| 5,730,420 A * | 3/1998 | Tow ...................... F16K 5/0689 251/315.05 |
| 7,036,793 B2 * | 5/2006 | Turnau, III et al. .. F16K 5/0414 251/175 |
| 2008/0099712 A1 * | 5/2008 | DeYoe .................. F16K 5/0626 251/315.01 |

* cited by examiner

Primary Examiner — Kevin Lee
(74) Attorney, Agent, or Firm — Rosenberg, Klein & Lee

(57) ABSTRACT

A ball valve includes an inner valve unit having a ball valve unit and a valve seat in which the ball valve unit is received. A shaft extends from the ball valve which is clamped between two retainers. The valve seat has a tubular shank and a lateral hole is defined radially through the shank. The shaft extends through the valve seat. The housing is made of metal and has a chamber for receiving the inner valve unit. The housing has an inlet and an outlet which is located corresponding to the lateral hole of the valve seat and the central holes of the retainers. The shaft extends through the installation hole of the housing and is connected with a switch which is operated to rotate the ball valve between open and sealed positions. The water does not contact the metallic parts and the structure is simple and easily assembled.

12 Claims, 16 Drawing Sheets

STOP VALVE

BACKGROUND OF THE INVENTION

1. Fields of the Invention

The present invention relates to a stop valve, and more particularly, to a stop valve for faucets in sinks and kitchens.

2. Descriptions of Related Art

The conventional faucets generally includes a stop valve for preventing leakage. Lead are added in most of the faucets for reducing manufacturing cost, however, the stop valve is made by way of casing under over 1000 degrees Celsius so that the lead usually are located on the surface of the stop valves. The water running through the faucets easily break the surface of the lead to cause contamination to the environment and is harmful to the users health as well.

U.S. Pat. No. 7,036,793 B2 discloses a stop valve which has a valve member adapted to be rotatably received within a valve body to control the flow of fluid between an inlet and an outlet of the valve body. The valve member comprises a valve stein extending from the valve body to facilitate manipulation of the valve member within the valve body. The valve stein has a substantially rigid material property; and a valve sleeve attached to the valve stein such that manipulation of the valve stein is transmitted to the valve sleeve. The valve sleeve includes an inner chamber and an outlet port wherein the valve sleeve is selectively movable between an open position directing fluid flow from the valve body inlet through the outlet port to the valve body outlet and a closed position, so as to prevent fluid flow through the valve body. The valve sleeve is less rigid than the valve stein for improved sealing within the valve body.

However, there are multiple parts involve complicated shapes and the manufacturing cost is high. The valve sleeve is less rigid than the valve stein, so that when operating the valve stein, the valve sleeve rotates and can be worn out.

Another conventional stop valve known to applicant is disclosed in Taiwanese Patent Publication No. M 520103, and comprises a body, a top seat, a ball valve, a switch and a bottom seat. The body has a cartridge, an inner slot and an outlet connector. The cartridge and the outlet connector are made by metal, and the inner slot is made by plastic. The top seat is threadedly connected to the cartridge and has a connection portion made of metal, and a path made of plastic. The path communicates with the inner slot. The ball valve is made of plastic and located in the inner slot. The switch is rotatably installed to the cartridge and engaged with the ball valve. The bottom seat is connected to the body and includes a seal head which is made by metal, and a regulator which is located in the seal head and made of plastic. The seal head is threadedly connected to the cartridge. The body, the top seat, the ball valve and the bottom seat form a unit which includes a metal outside portion and a plastic inner portion.

However, the plastic parts are easily worn out, and some parts includes both plastic and metal increase manufacturing cost.

The present invention intends to provide a stop valve to improve the shortcomings mentioned above.

SUMMARY OF THE INVENTION

The present invention relates to a ball valve and comprises an inner valve unit having a ball valve unit and a valve seat in which the ball valve unit is received. The valve seat is made of plastic. The ball valve unit has a ball valve and two retainers, wherein each retainer has a central hole so as to clamp the ball valve between the two retainers. The ball valve has a through hole defined diametrically therethrough. A shaft extends from the ball valve. The valve seat has a tubular shank, and a lateral hole is defined radially through the shank, and a connection hole is defined in the distal end of the shank. The shank has an inner hole. The lateral hole is located corresponding to the two central holes of the two retainers. The ball valve is located in the inner hole and rotatable to communicate the through hole with the lateral hole and the central holes. The distal end of the shaft extends through the connection hole of the valve seat.

A housing has a chamber defined therein and the inner valve unit is received in the chamber. The valve seat is secured in the chamber. The housing has an inlet and an outlet. The outlet is located corresponding to the lateral hole of the valve seat and the central holes of the retainers. An installation hole is defined in the top of the housing and communicates with the chamber. The shaft of the ball valve unit extends through the installation hole. A switch is connected to the installation hole and securely connected to the shaft such that when rotating the switch, the ball valve rotates between open and sealed positions.

The primary object of the present invention is to provide a stop valve which inner valve unit includes plastic-made parts and can be independently assembled. The whole inner valve unit is received in the housing which is made of metal so that the plastic parts are prevented from being worn out. The whole inner valve unit is assembled and easily assembled in the housing, and switch is then installed to finish the assembling processes. The stop valve is easily assembled and has longer life and no lead or other heavy metal being used to contaminate the environment.

The housing is made of metal and the inner valve unit is made of plastic. The housing and the inner valve unit are separately independently manufactured so that the management of manufacturing is easily controlled.

The ball valve is clamped between two retainers, and the valve seat is mounted to the outside of the ball valve unit so that the outside of the valve seat contacts the inside of the chamber of the housing does not have relative movement relative to the housing to have longer service life.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
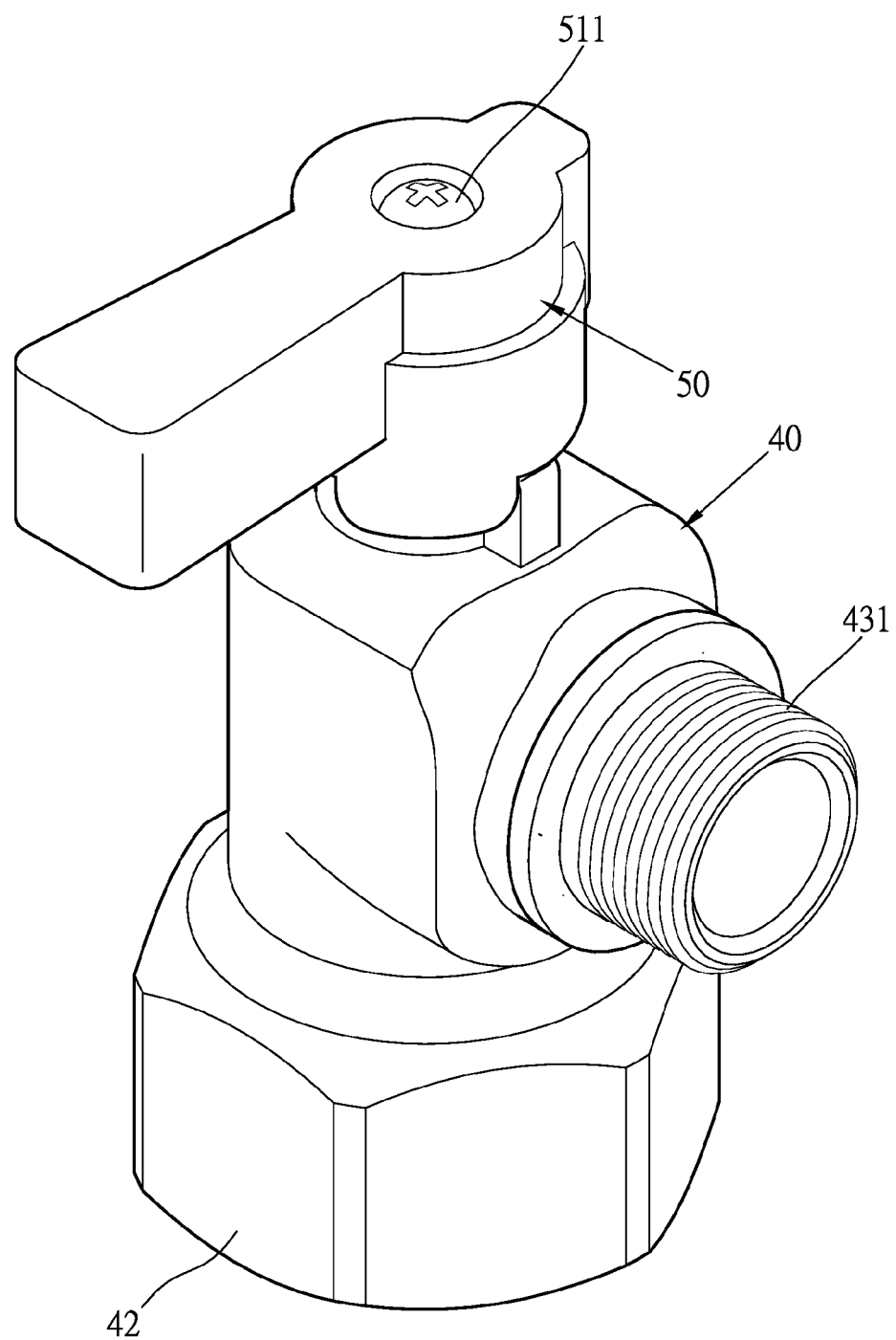
FIG. 1 is a perspective view to show the stop valve of the present invention.
Figure 2:
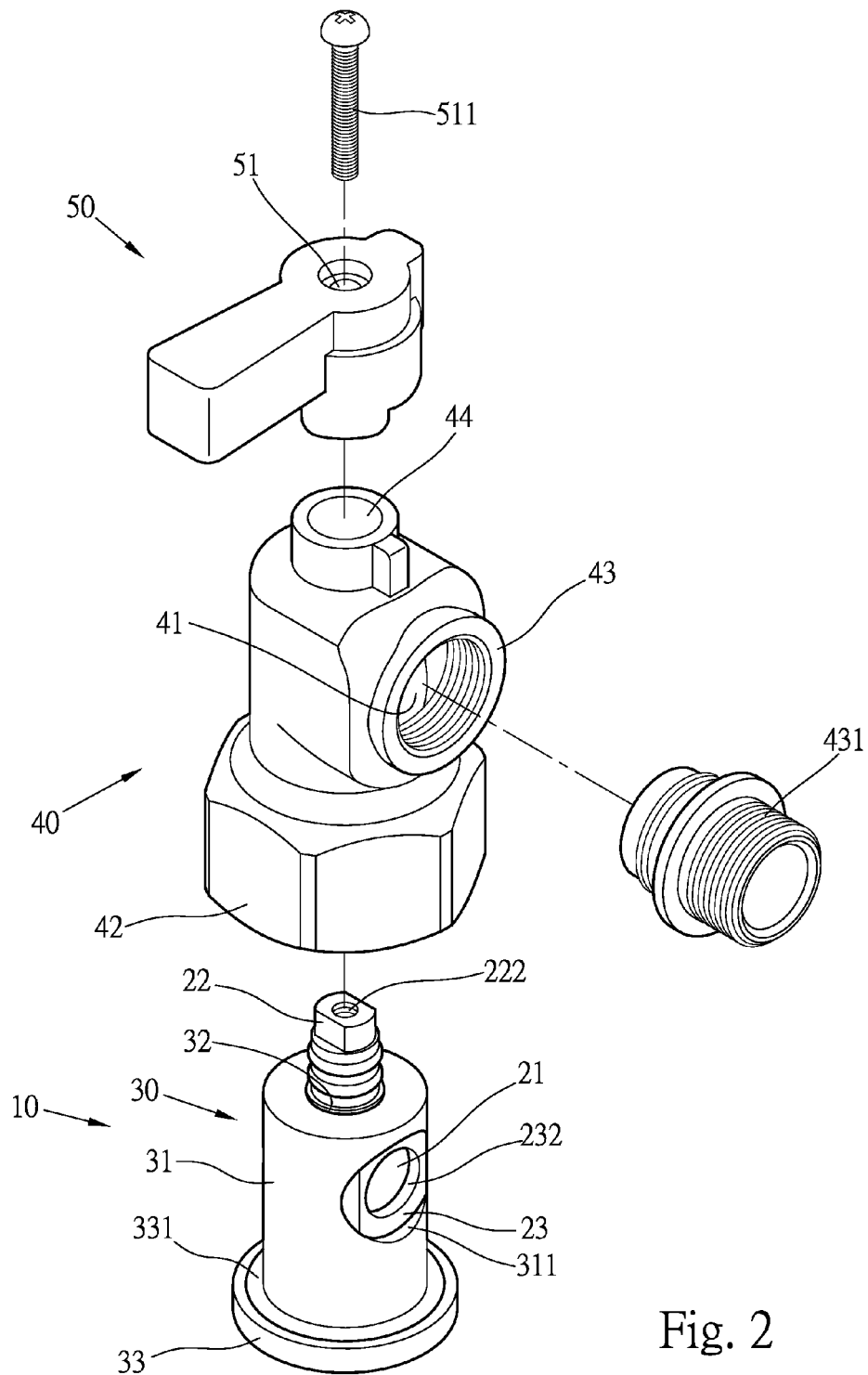
FIG. 2 is an exploded view to show the stop valve of the present invention.

Referring to FIGS. 1 and 2, the stop valve of the present invention comprises an inner valve unit 10, a housing 40 and a switch 50.

Figure 3:
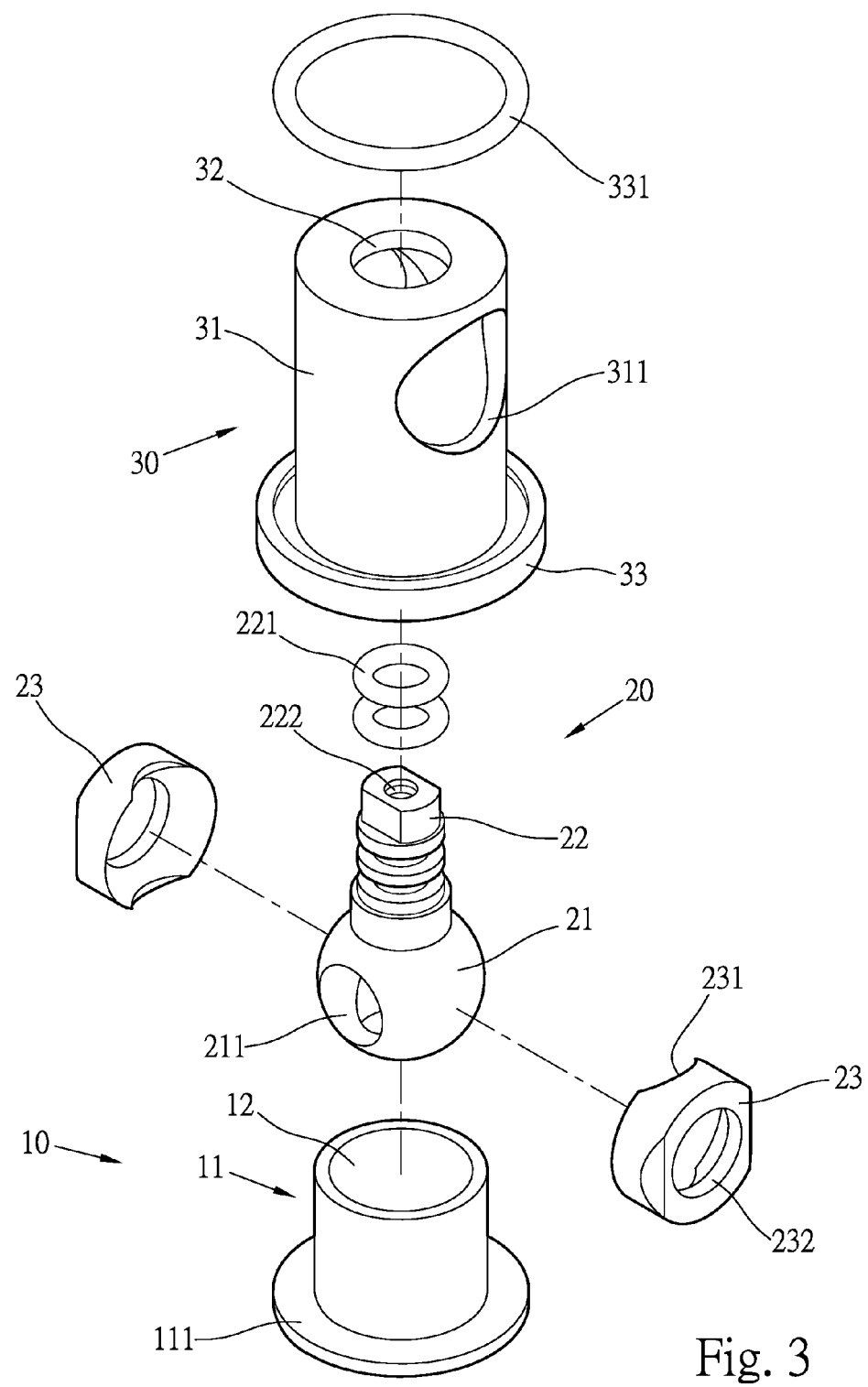
FIG. 3 is an exploded view to show the inner valve unit of the stop valve of the present invention.
Figure 4:
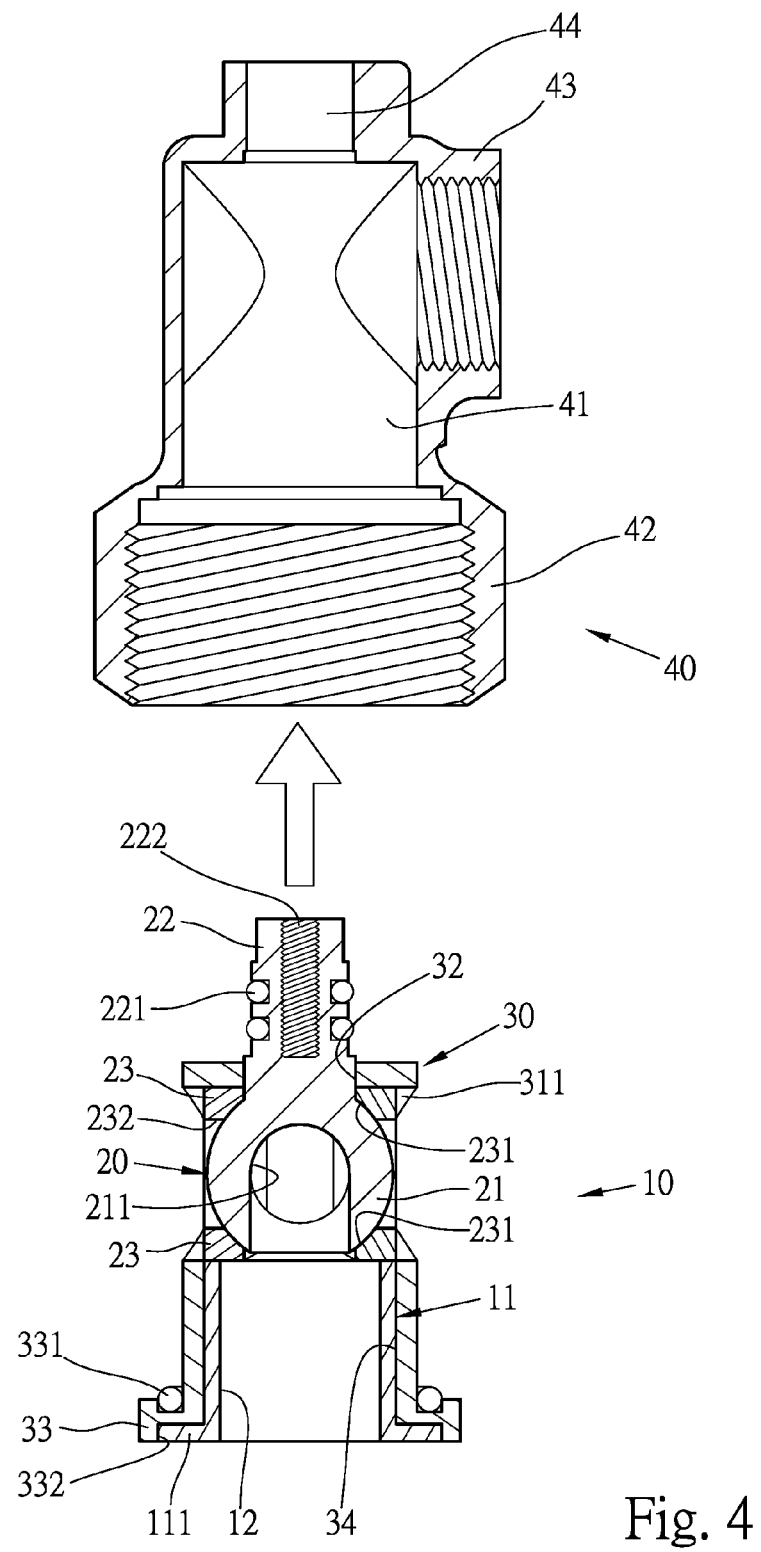
FIG. 4 shows the cross sectional view of the inner valve unit and the housing.

As shown in FIGS. 2 and 3, the inner valve unit 10 comprises a ball valve unit 20 and a valve seat 30 in which the ball valve unit 20 is received. The valve seat 30 is made of plastic. The ball valve unit 20 has a ball valve 21 and two retainers 23, wherein each retainer 23 has a recessed and curved face 231, and a central hole 232 is defined through the center of the recessed and curved face 231 so that a portion of the ball valve 21 is received in the recessed and curved faces 231. In other words, the ball valve 21 is clamped between the two retainers 23. A shaft 22 extends from the ball valve 21. As shown in FIGS. 2 to 4, the valve seat 30 has a tubular shank 31, and a lateral hole 311 is defined radially through the shank 31, and a connection hole 32 is defined in the distal end of the shank 31. The shank 31 has an inner hole 34. The inner diameter of the inner hole 34 is larger than that of the connection hole 32, and is smaller than that of the enlarged recess 332. The lateral hole 311 is located corresponding to the two central holes 232 of the two retainers 23. The ball valve 21 is located in the inner hole 34 and rotatable to communicate the through hole 211 with the lateral hole 311 and the central holes 232. Thanks to the size of the inner hole 34 which allows the ball valve unit 20 and the cartridge 11 to be received in the valve seat 30, and the connection hole 32 is sized to let the distal end of the shaft 22 extend through the connection hole 32 of the valve seat 30. When the ball valve 21 is rotated, the through hole 211 is located to communicate the lateral hole 311.

Specifically, the inner valve unit 10 includes the valve seat 30 and a cartridge 11 which is made of plastic. The cartridge 11 is located at the lower end of the ball valve 20 so that the valve seat 30 is mounted to the cartridge 11 and the ball valve 20. The cartridge 11 is a hollow part and has a flange 111 extending radially from one end thereof. A passage 12 is defined axially in the cartridge 11. One of the retainers 23 is rested on the top of the cartridge 11 and the rested on the periphery of the passage 12 of the cartridge 11. The valve seat 30 is mounted to the ball valve unit 20 and the cartridge 11. The valve seat 20 has a support portion 33 extending radially from one end thereof which is located opposite to the connection hole 32. An enlarged recess 332 is defined in the underside of the support portion 33 so that the flange 111 of the cartridge 11 is engaged with the enlarged recess 332.

Figure 5:
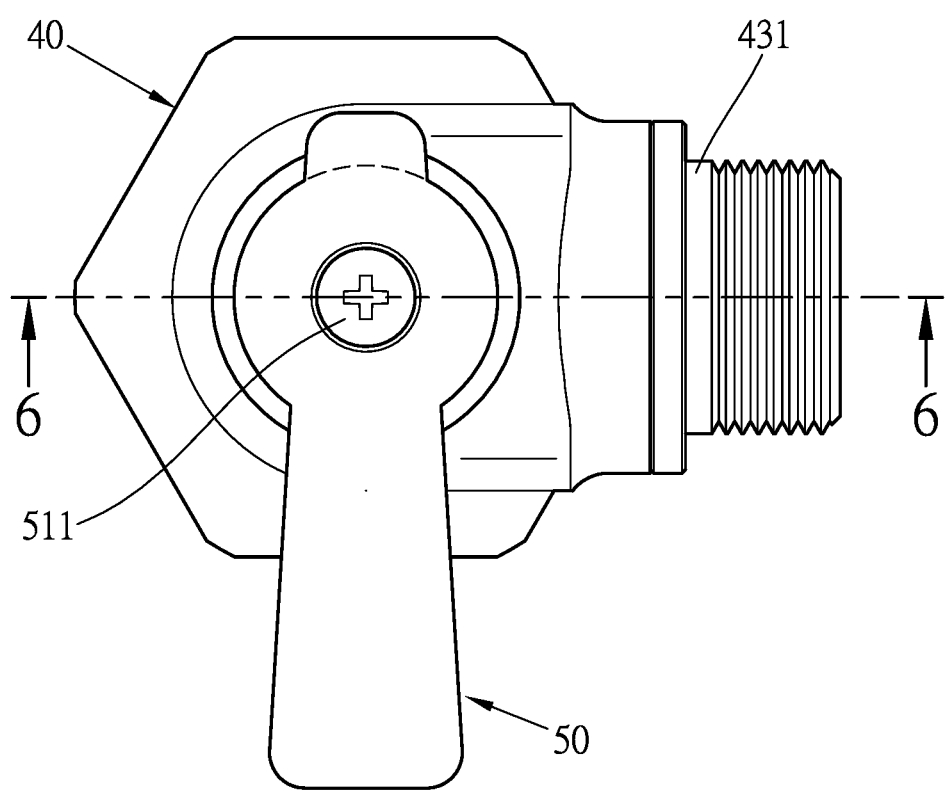
FIG. 5 is a top view to show that the stop valve is in the shut-off position.

As shown in FIGS. 2, 4, and 5, the housing 40 is a casting metal-made housing and has a chamber 41 defined therein and the inner valve unit 10 is received in the chamber 41. The valve seat 30 is secured in the chamber 41. The housing 40 has an inlet 42 and an outlet 43, wherein the axis of the inlet 42 is perpendicular to the axis of the outlet 43 of the housing 40. The inlet 42 has inner threads so as to be a pipe, and the outlet 43 is connected with an outlet adapter 431. The outlet 43 is located corresponding to the lateral hole 311 of the valve seat 30 and the central holes 232 of the retainers 23. The inlet 42 is located at the underside of the housing 40. The inner valve unit 10 is inserted into the chamber 41 from the inlet 42 of the housing 40. An installation hole 44 is defined in the top of the housing 40 and communicates with the chamber 41. The shaft 22 of the ball valve unit 20 extends through the installation hole 44. Two seal rings 221 are mounted to the shaft 22 and snugly contact the inside of the installation hole 44 to prevent from leakage. A groove 411 is defined in the connection area between the inlet 42 and the chamber 41. A seal ring 331 is mounted to outside of the shank 31 and received in the top of the support portion 33 and the groove 411 so as to ensure no leakage happens between the housing 40 and the inner valve unit 10.

A switch 50 is an elongate switch and has a hole 51 defined in one end thereof. The shaft 22 has a locking hole 222 defined in the distal end thereof. A bolt 511 extends through the hole 51 and is threadedly connected to the locking hole 222 of the shaft 22 so that the switch 22 is connected to the installation hole 44 and securely connected to the shaft 22 such that when rotating the switch 50, the ball valve 21 rotates between open and shut-off positions. In this embodiment, the shaft 22 integrally extends from the ball valve 21.

Figure 6:
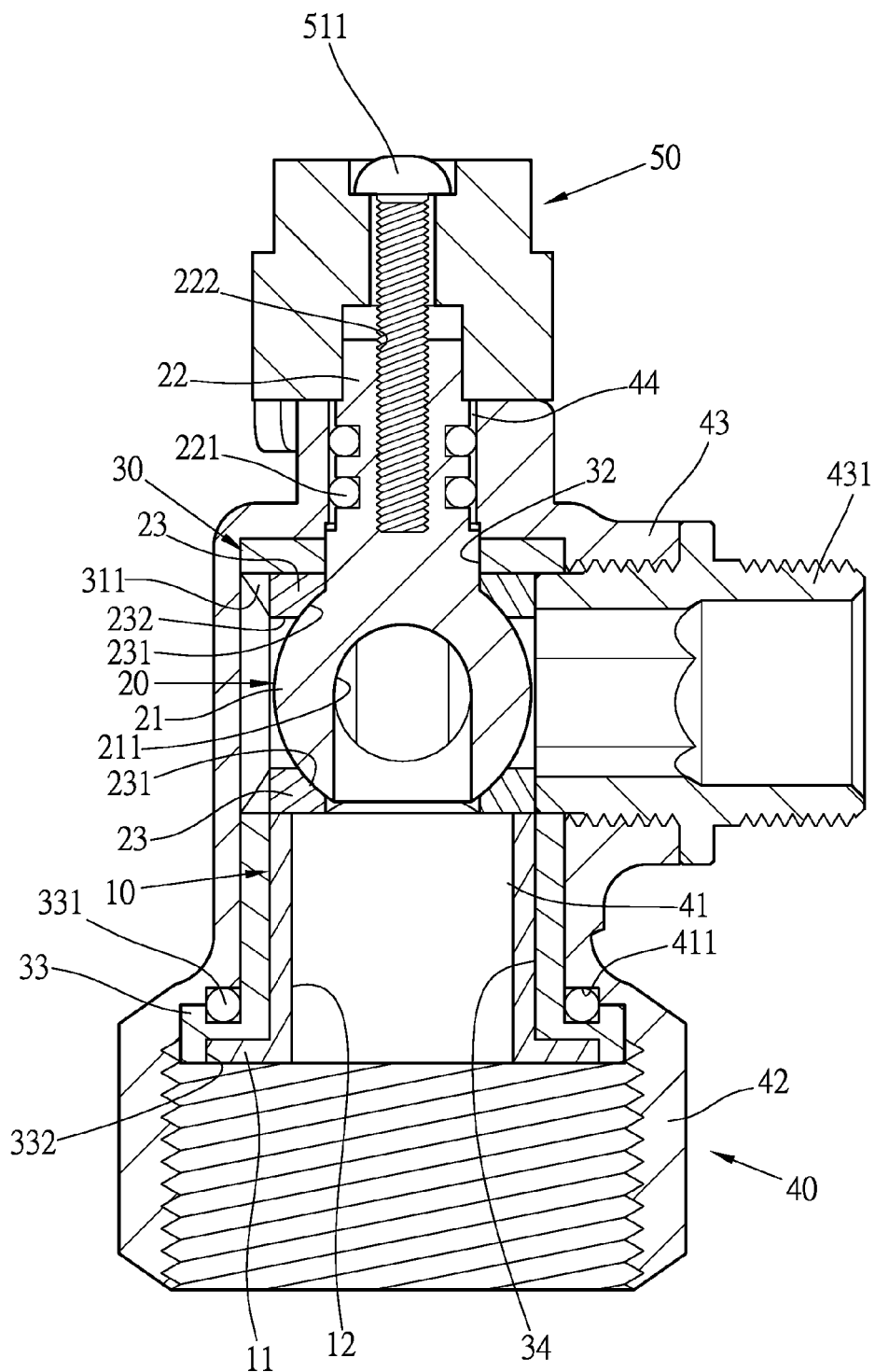
FIG. 6 is a cross sectional view, taken along line 6-6 in FIG. 5.

As shown in FIGS. 5 and 6, when the stop valve is to be turned to the shut-off position, the switch 50 is rotated 90 degrees to drive the shaft 22 and the ball valve 21. The ball valve 21 is stably rotated between the two retainers 23, and the through hole 211 is moved away from the central hole 232, the lateral hole 311 and the outlet 43. The closed portion of the ball valve 21 faces the central hole 232 and the outlet 43, and the water in the inlet 42 cannot flows through the outlet 43 and the outlet adapter 431 via the ball valve 21.

Figure 7:
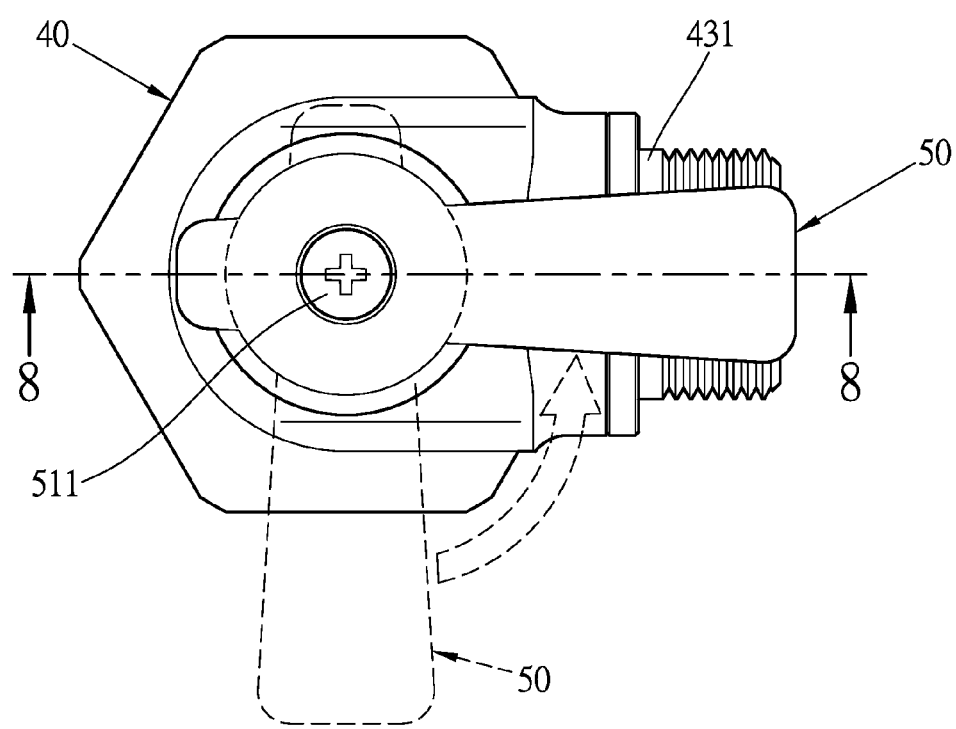
FIG. 7 is a top view to show that the stop valve is in the open position.
Figure 8:
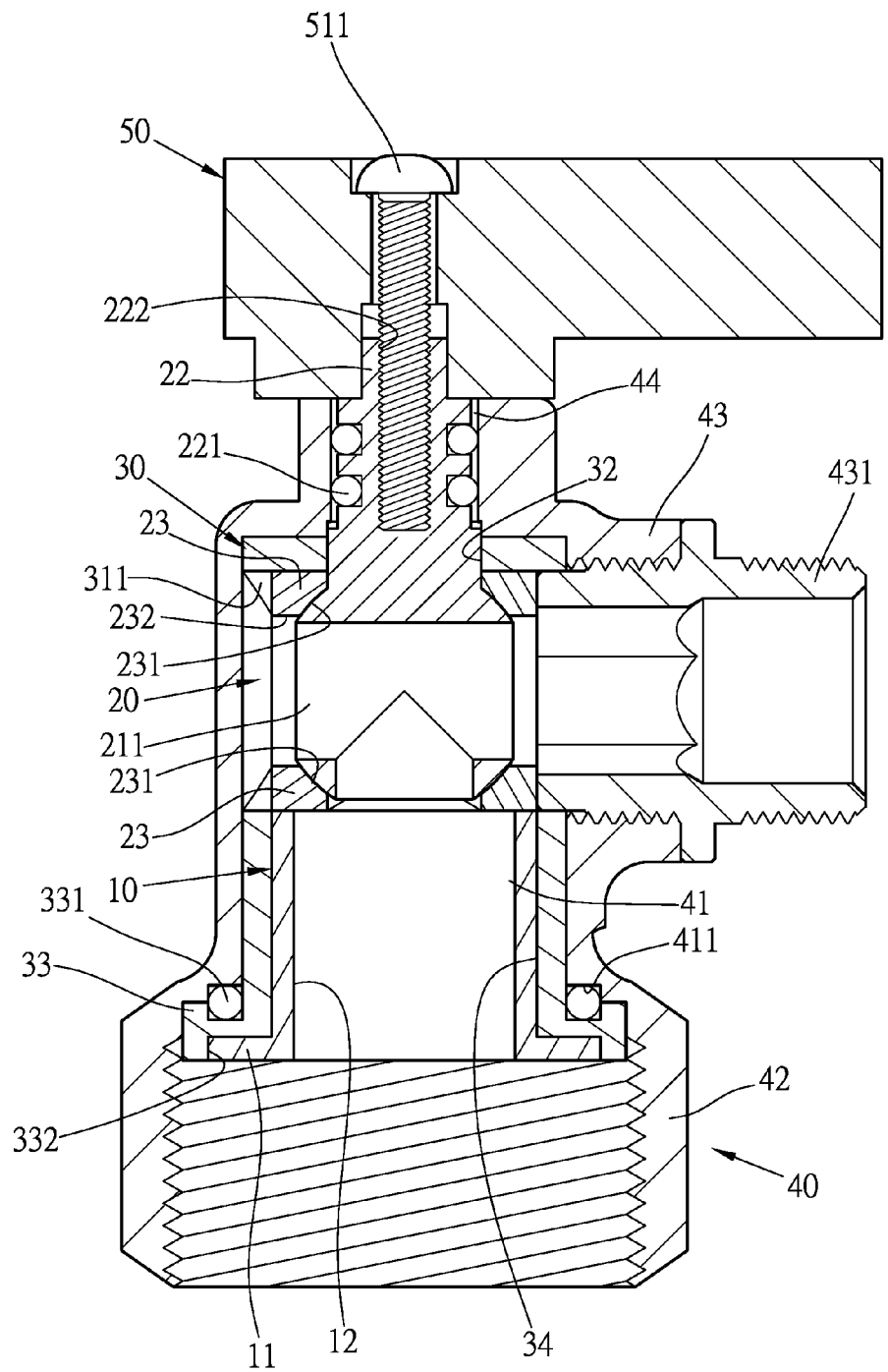
FIG. 8 is a cross sectional view, taken along line 8-8 in FIG. 7.

On the contrary, as shown in FIGS. 7 and 8, when the stop valve is to be turned to the open position, the switch 50 is rotated 90 degrees to drive the shaft 22 and the ball valve 21. The ball valve 21 is stably rotated between the two retainers 23, and the through hole 211 is moved to be in alignment with the central hole 232 and the outlet 43. The water in the inlet 42 flows through the cartridge 11, the ball valve 21, and the lateral hole 311, and flow out from the outlet 43 and the outlet adapter 431, such that the uses can get the water.

The water of the stop valve contacts the passage 12 of the cartridge 11, the ball valve 21, the central holes 232 of the retainers 23 which are plastic parts, the lateral hole 311 of the valve seat 30 which is a plastic part, and the outlet 43. In other words, the water does not contact metallic parts to reduce the potential contamination from the metal. The inner valve unit 10 is clamped by the cartridge 11 and the valve seat 30 so that the assembly for the inner valve unit 10 can be more easily assembled.

Figure 9:
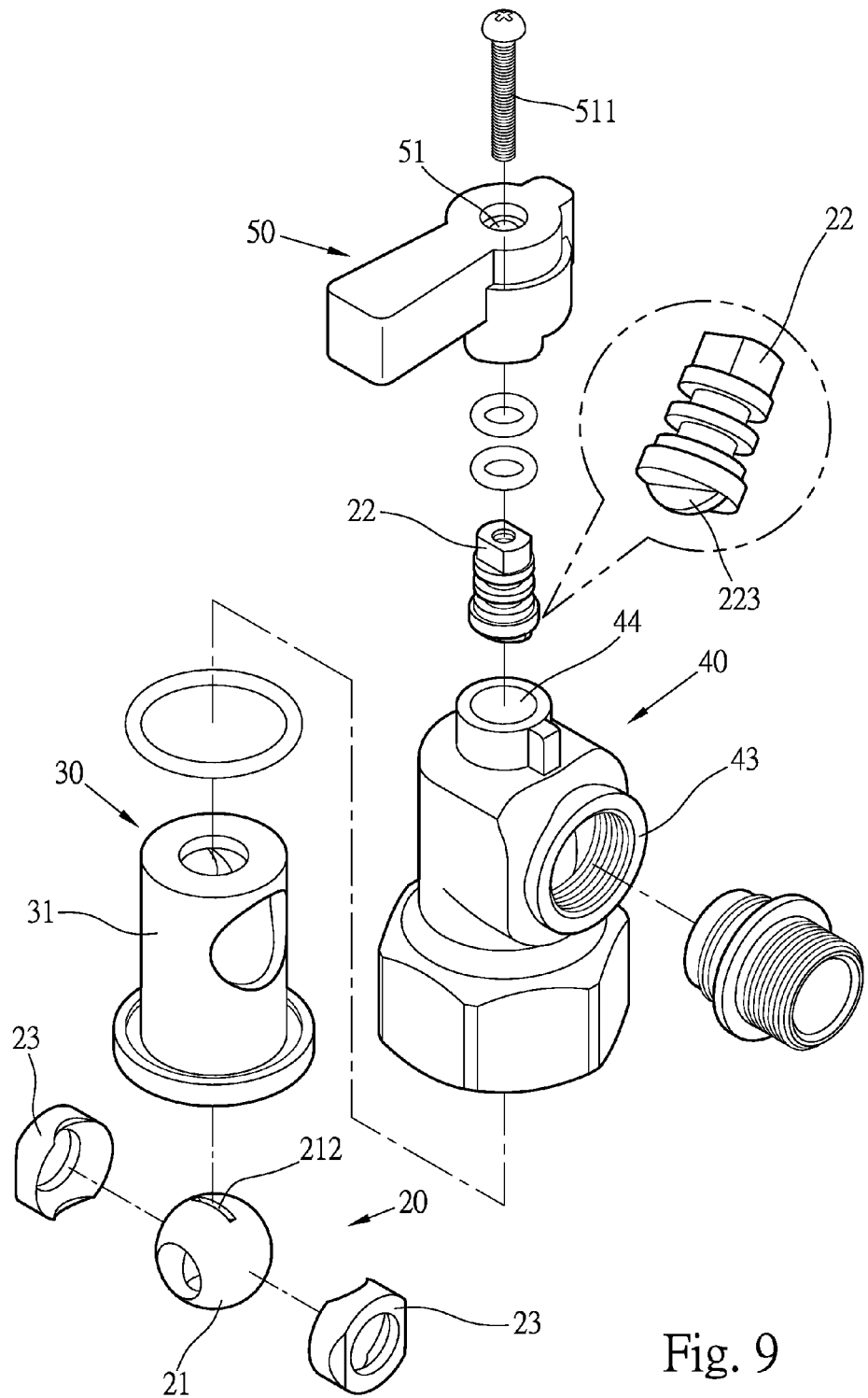
FIG. 9 is an exploded view to show a second embodiment of the stop valve of the present invention.
Figure 10:
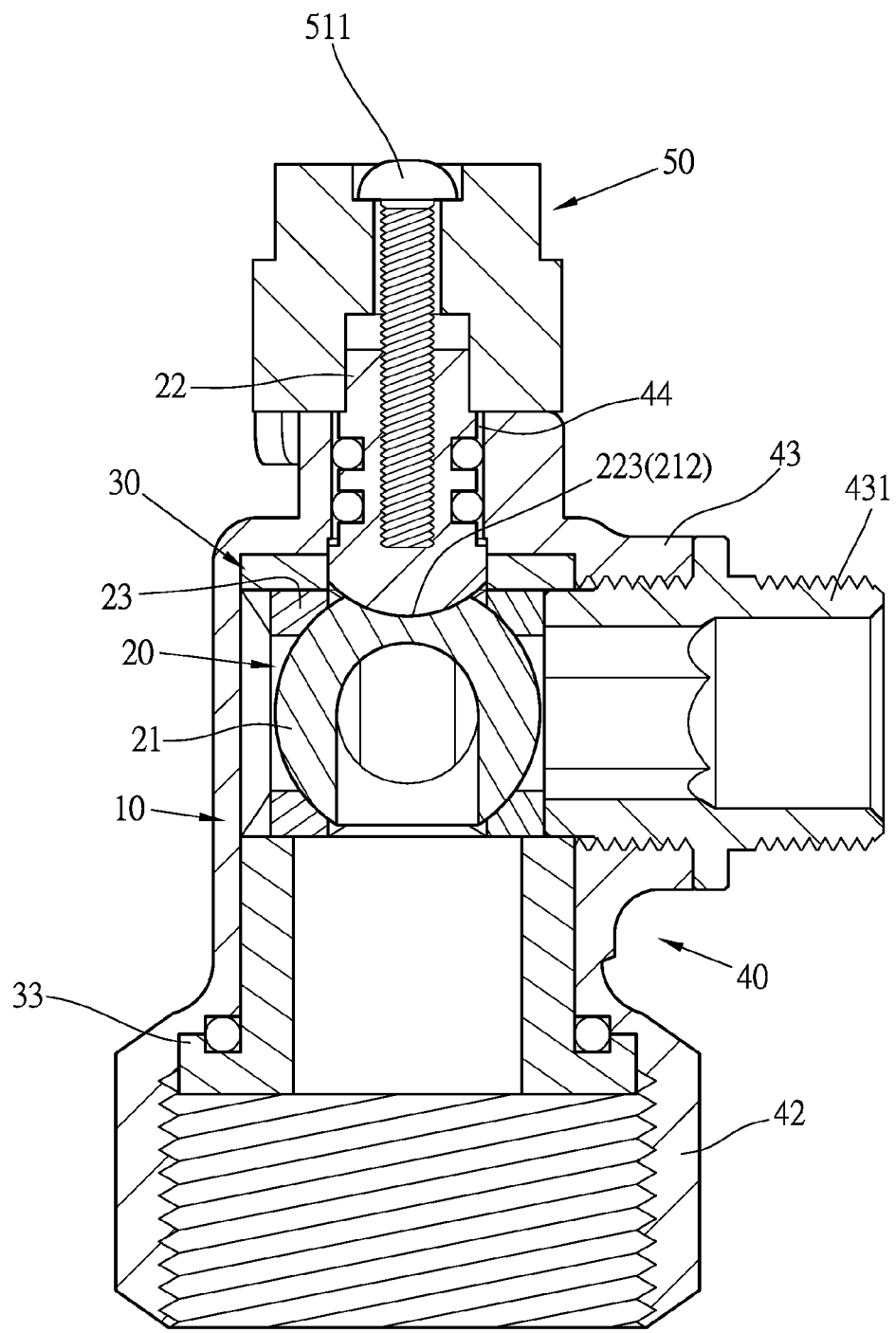
FIG. 10 is a cross sectional view to show that the stop valve in FIG. 9 is in the shut-off position.

As shown in FIGS. 9 and 10, the ball valve 21 of the inner valve unit 10 and the shaft 22 can be two individual parts, wherein the ball valve 21 has a slot 212 defined in the outer periphery thereof. The shaft 22 has a tongue 223 extending from one end thereof. The inner valve unit 10 is installed in the chamber 41 via the inlet 42 of the housing 40, and the shaft 22 is inserted via the installation hole 44 to engage the tongue 223 with the slot 212 to connect the shaft 22 to the ball valve 21. The switch 50 is then eventually locked to the shaft 22 to finish the assembling processes.

Figure 11:
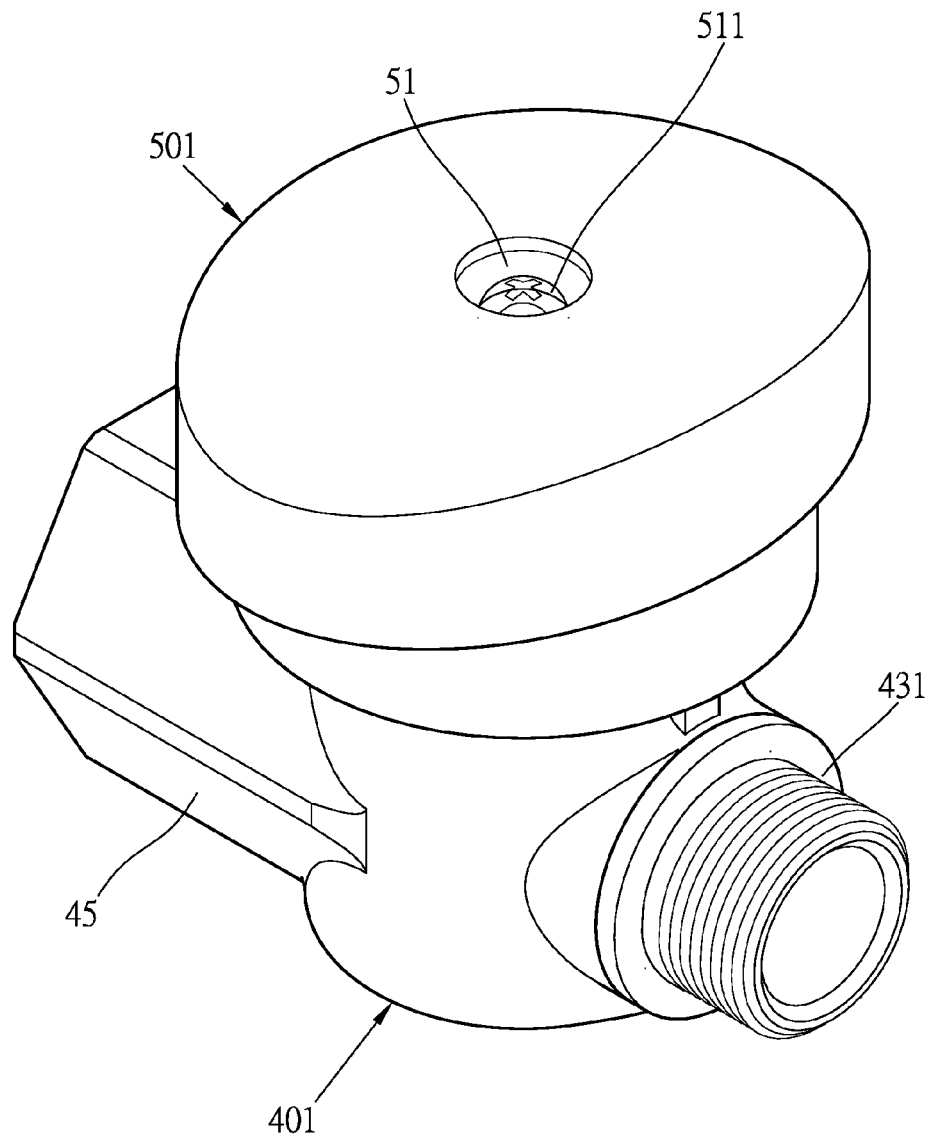
FIG. 11 is a perspective view to show the third embodiment of the stop valve of the present invention.
Figure 12:
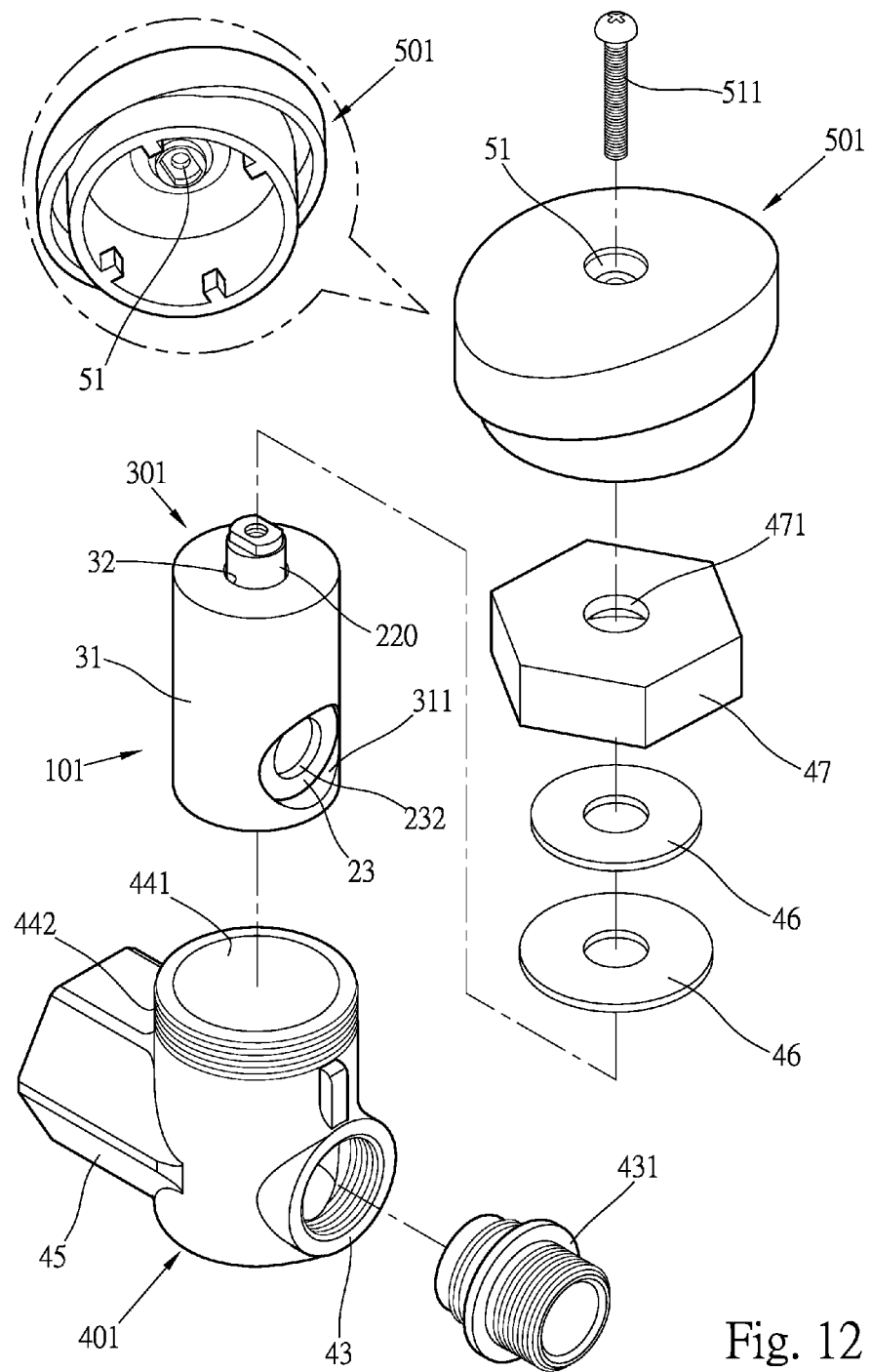
FIG. 12 is an exploded view to show the third embodiment of the stop valve of the present invention.
Figure 13:
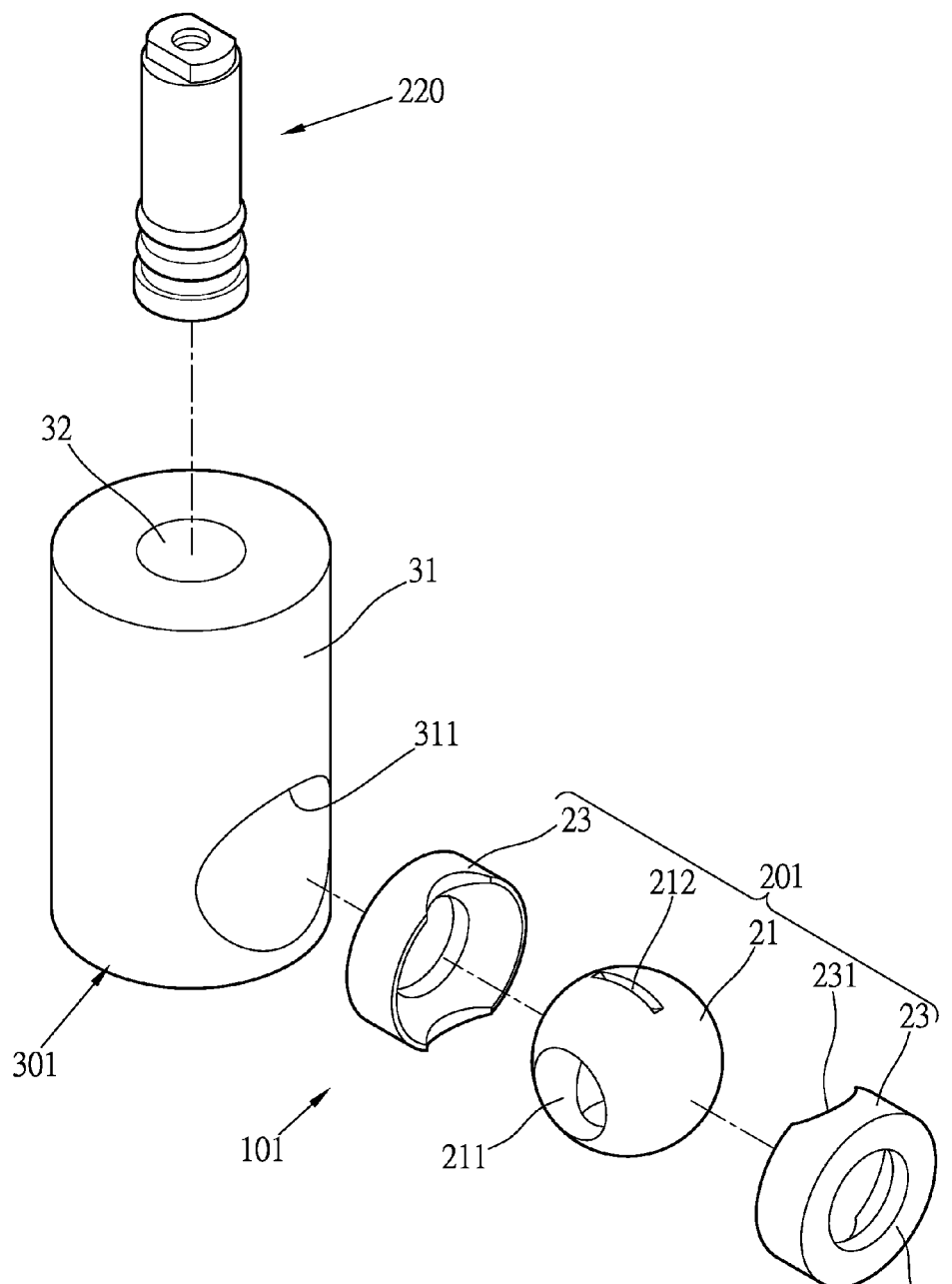
FIG. 13 is an exploded view to show inner valve unit of the third embodiment of the stop valve of the present invention.

As shown in FIGS. 11 to 13, another embodiment is disclosed, wherein the axis of the inlet 42 and the axis of the outlet 43 of the housing 401 are located on the same horizontal axis. The inner valve 101 has another embodiment wherein, as shown in FIGS. 12 to 16, the inner ball valve unit 101 includes a ball valve 201 and a valve seat 301. The ball valve 201 includes a shaft 220 and a ball valve 21 which is clamped between the two retainers 23. The ball valve 21 has a slot 212 and the shaft 220 has a tongue 223 which is engaged with the slot 212. The valve seat 301 has a tubular shank 31 which has a lateral hole 31 and a connection hole 32. An inner hole 34 is defined in the shank 31 and communicates with the connection hole 32. The ball valve unit 201 and the ball valve 21 are installed in the inner hole 34 of the valve seat 301. The central holes 232 of the retainers 23 communicate with the lateral hole 311. The shaft 220 extends into the inner hole 34 via the connection hole 32 and is engaged with the slot 212 to assemble the simplified version of the inner ball valve unit 101.

The axis of the inlet 42 and the axis of the outlet 43 of the housing 401 are located on the same horizontal axis. The housing 401 has outer threads 442 defined in the outside thereof and located close to the installation hole 441. A cap 47 is threadedly connected to the outer threads 442. The cap 47 has an aperture 471 defined centrally therethrough. The shaft 220 extends through the aperture 471, and a washer 46 is rested on the periphery of the installation hole 441, and the inside of the cap 47 presses on the washer 46. The cap 47 applies an axial force from the installation hole 441 to press the valve seat 301 in the chamber 41 so that the retainers 23, the central holes 232, the lateral hole 311 and the outlet 43 are located along a straight line.

The switch 501 is mounted to the cap 47 and the hole 51 is located corresponding to the shaft 220 of the inner valve unit 101. By the bolt 511, the switch 501 is connected to the shaft 220 to control the positions of the shaft 220 and the ball valve 21.

Figure 14:
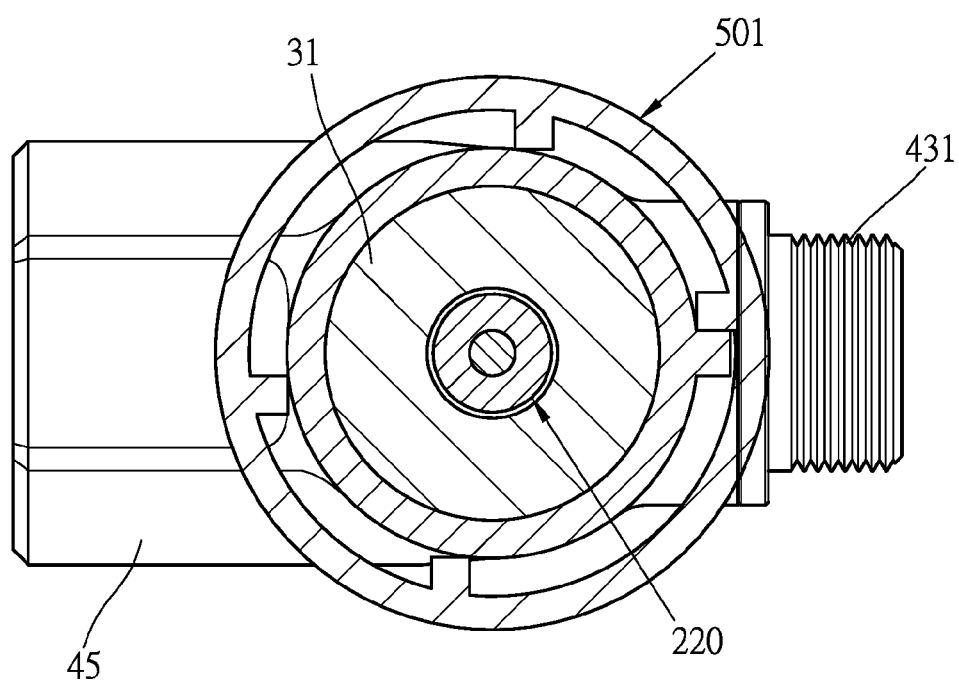
FIG. 14 is a top view to show that the third embodiment of the stop valve is in the shut-off position.
Figure 15:
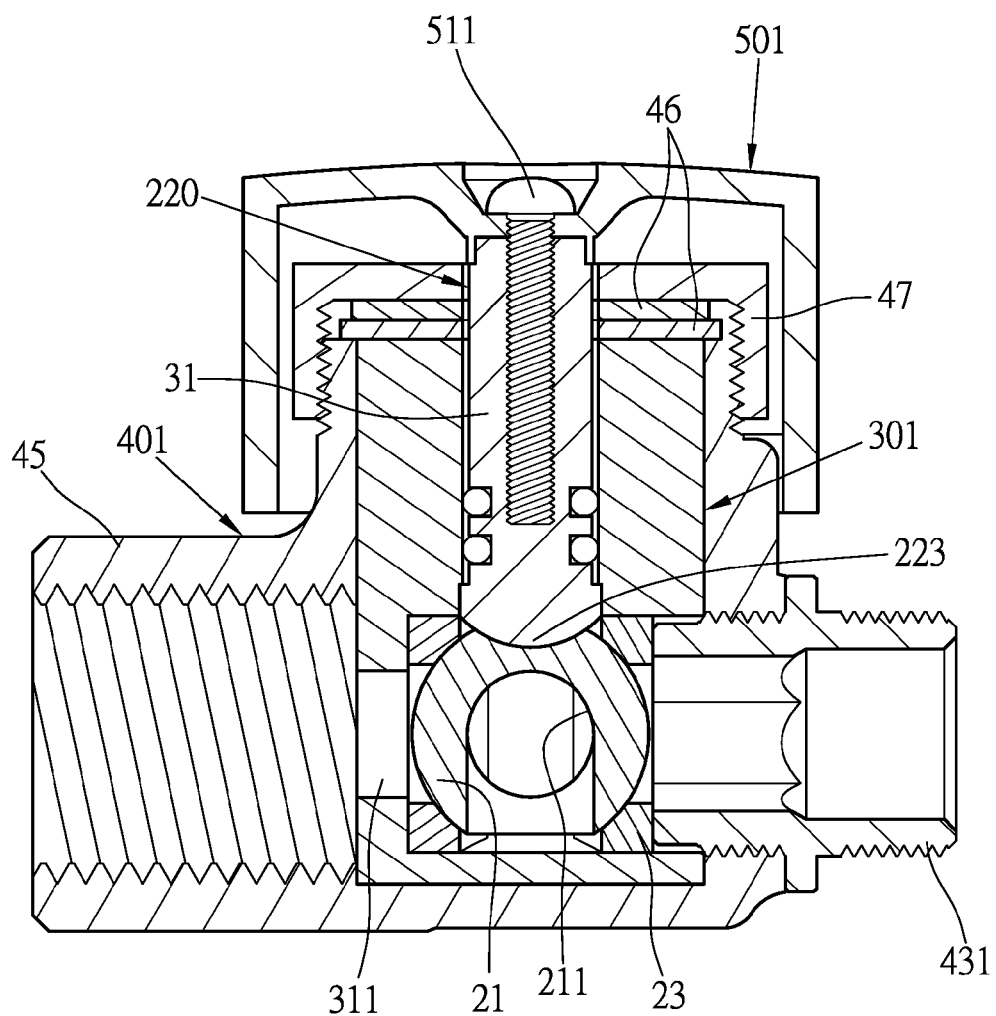
FIG. 15 is a cross sectional view to show the shut-off status of third embodiment of the stop valve of the present invention.

As shown in FIGS. 14 and 15, when the switch 501 is located at the shut-off position, the through hole 211 of the ball valve 21 moves away from the central holes 232, the outlet 43 and the outlet adapter 431 so that the closed portion of the ball valve 21 faces the central holes 232 and the outlet 43 so that the water in the inlet 45 cannot flow out from the outlet 43 and the outlet adapter 431 via the ball valve 21.

Figure 16:
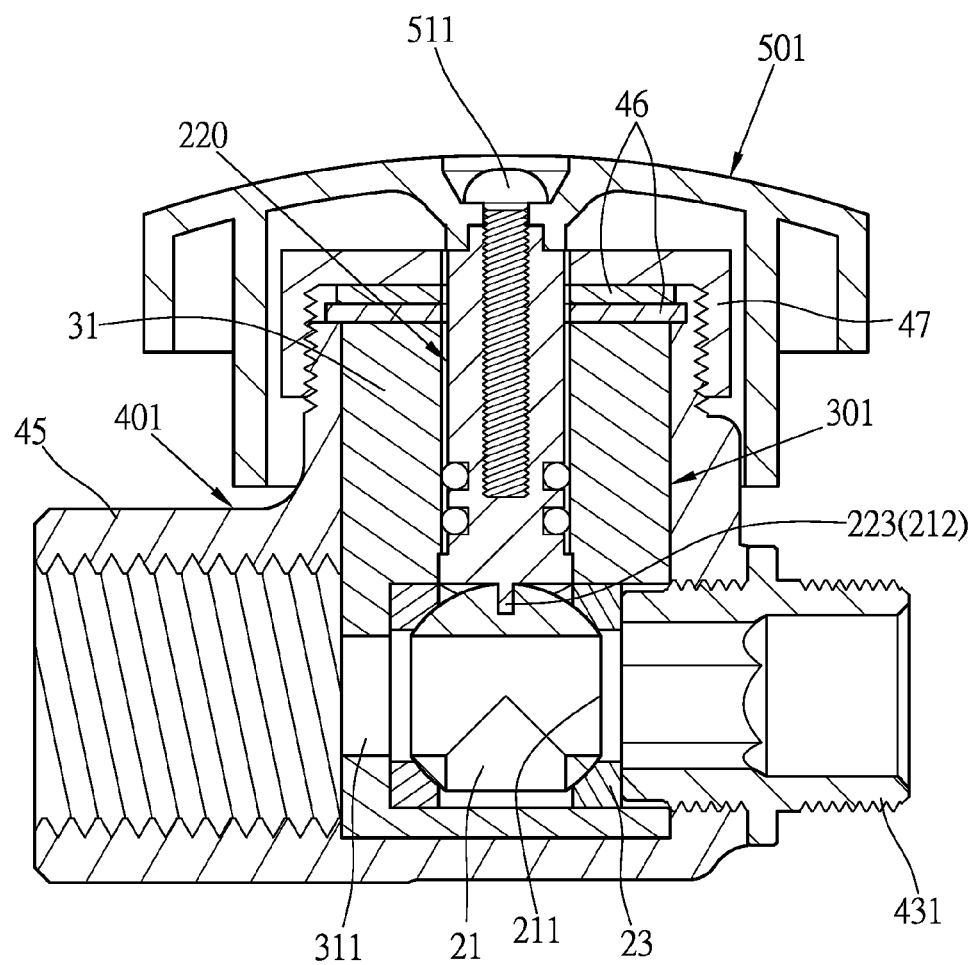
FIG. 16 is a cross sectional view to show the open status of third embodiment of the stop valve of the present invention.

On the contrary, as shown in FIG. 16, when the switch 501 is located at the open position, the switch 501 is rotated 90 degrees to drive the shaft 220 and the ball valve 21. The ball valve 21 is stably rotated between the two retainers 23, and the through hole 211 is moved to be in alignment with the central hole 232, the lateral hole 311 and the outlet 43. The water in the inlet 42 flows through the cartridge 11 and the ball valve 21, and flow out from the outlet 43 and the outlet adapter 431 for the uses.

While we have shown and described the embodiment in accordance with the present invention, it should be clear to those skilled in the art that further embodiments may be made without departing from the scope of the present invention.

What is claimed is:

1. A ball valve comprising:
an inner valve unit having a ball valve unit and a valve seat in which the ball valve unit is received, the ball valve unit having a ball valve and two retainers, each retainer having a central hole so as to clamp the ball valve between the two retainers, the ball valve having a through hole defined diametrically therethrough, a shaft extending from the ball valve, the valve seat having a tubular shank, a lateral hole defined radially through the shank, and a connection hole defined in a distal end of the shank, the shank having an inner hole, the lateral hole located corresponding to the two central holes of the two retainers, the ball valve located in the inner hole and rotatable to communicate the through hole with the lateral hole and the central holes, a distal end of the shaft extending through the connection hole of the valve seat, and
a housing having a chamber defined therein and the inner valve unit received in the chamber, the valve seat being secured in the chamber, the housing having an inlet and an outlet, the outlet located corresponding to the lateral hole of the valve seat and the central holes of the retainers, an installation hole defined in a top of the housing and communicating with the chamber, the shaft of the ball valve unit extending through the installation hole, a switch connected to the installation hole and securely connected to the shaft such that when rotating the switch, the ball valve rotates between open and shut-off positions.

2. The ball valve as claimed in claim 1, wherein the shaft integrally extends from the ball valve.

3. The ball valve as claimed in claim 1, wherein the ball valve unit has the ball valve and the shaft, the ball valve has a slot defined in an outer periphery thereof, the shaft has a tongue extending from one end thereof, the tongue is engaged with the slot to connect the shaft to the ball valve.

4. The ball valve as claimed in claim 1, wherein the retainers each have a recessed and curved face for receiving a portion of the ball valve.

5. The ball valve as claimed in claim 1, wherein an axis of the inlet is perpendicular to an axis of the outlet of the housing.

6. The ball valve as claimed in claim 1, wherein an axis of the inlet and an axis of the outlet of the housing are located on a same horizontal axis.

7. The ball valve as claimed in claim 1, wherein the inner valve unit includes a cartridge, the cartridge is located at a lower end of the ball valve so that the valve seat is mounted to the cartridge and the ball valve.

8. The ball valve as claimed in claim 7, wherein the cartridge is a hollow part and has a flange extending radially from one end thereof, a passage defined axially in the cartridge, one of the retainers is rested on a top of the cartridge, the valve seat is mounted to the ball valve unit and the cartridge, the valve seat has a support portion extending radially from one end thereof which is located opposite to the connection hole, an enlarged recess is defined in an underside of the support portion so that the flange of the cartridge is engaged with the enlarged recess.

9. The ball valve as claimed in claim 1, wherein an axis of the inlet is perpendicular to an axis of the outlet of the housing, the inlet is located at an underside of the housing, a groove is defined in a connection area between the inlet and the chamber, a seal ring is mounted to outside of the shank and received in a top of the support portion and the groove.

10. The ball valve as claimed in claim 1, wherein an axis of the inlet and an axis of the outlet of the housing are located on a same horizontal axis, the housing has outer threads defined in an outside thereof and located close to the installation hole, a cap is threadedly connected to the outer threads, the cap has an aperture defined centrally therethrough, the shaft extends through the aperture, a washer is rested on a periphery of the installation hole and an inside of the cap presses on the washer.

11. The ball valve as claimed in claim 1, wherein the switch is an elongate switch and has a hole defined in one end thereof, the shaft has a locking hole defined in a distal end thereof, a bolt extends through the hole and is threadedly connected to the locking hole of the shaft.

12. The ball valve as claimed in claim 1, wherein the switch is a hat-shaped switch which is mounted to outside of the installation hole, the switch has a hole, the shaft has a locking hole defined in a distal end thereof, a bolt extends through the hole and is threadedly connected to the locking hole of the shaft.

\* \* \* \* \*